United States Patent
Tanioka et al.

(10) Patent No.: US 8,413,425 B2
(45) Date of Patent: Apr. 9, 2013

(54) CONTROL DEVICE AND CONTROL METHOD FOR EXHAUST GAS PURIFICATION APPARATUS, AND INTERNAL COMBUSTION ENGINE EXHAUST GAS PURIFICATION APPARATUS

(75) Inventors: Kenichi Tanioka, Saitama (JP); Fumiyasu Kurogi, Saitama (JP); Takeshi Miyamoto, Saitama (JP)

(73) Assignee: Bosch Corporation, Tokyo (JP)

(*) Notice: Subject to any disclaimer, the term of this patent is extended or adjusted under 35 U.S.C. 154(b) by 0 days.

(21) Appl. No.: 12/599,834

(22) PCT Filed: Apr. 14, 2008

(86) PCT No.: PCT/JP2008/057300
§ 371 (c)(1),
(2), (4) Date: Nov. 12, 2009

(87) PCT Pub. No.: WO2008/139813
PCT Pub. Date: Nov. 20, 2008

(65) Prior Publication Data
US 2010/0229530 A1    Sep. 16, 2010

(30) Foreign Application Priority Data
May 11, 2007   (JP) .................................. 2007-127144

(51) Int. Cl.
*F01N 3/20* (2006.01)
*F01N 9/00* (2006.01)

(52) U.S. Cl. ................ 60/286; 60/274; 60/295; 60/301; 60/303

(58) Field of Classification Search .................... 60/274, 60/286, 295, 301, 303
See application file for complete search history.

(56) References Cited

U.S. PATENT DOCUMENTS

| | | | | |
|---|---|---|---|---|
| 6,016,653 A * | 1/2000 | Glassey et al. | ................. | 60/274 |
| 6,415,602 B1 * | 7/2002 | Patchett et al. | ................. | 60/286 |
| 6,427,439 B1 * | 8/2002 | Xu et al. | ......................... | 60/286 |
| 6,871,490 B2 * | 3/2005 | Liang et al. | ..................... | 60/286 |
| 2007/0193253 A1 * | 8/2007 | Tsumagari | ...................... | 60/286 |

FOREIGN PATENT DOCUMENTS

| | | | |
|---|---|---|---|
| JP | 2003286828 A | 10/2003 | |
| JP | 2003301737 A | 10/2003 | |
| JP | 2005127256 A | 5/2005 | |
| JP | 200622729 A | 1/2006 | |

* cited by examiner

*Primary Examiner* — Kenneth Bomberg
*Assistant Examiner* — Brandon Lee
(74) *Attorney, Agent, or Firm* — Michael Best & Friedrich LLP

(57) ABSTRACT

A control device and method for exhaust gas purification that can prevent the adsorption amount from becoming excessively lower than the saturated adsorption amount and can prevent the reduction efficiency of the reduction catalyst from degrading, including a device which can predict a transition of the temperature of the reduction catalyst and determine whether that temperature is decreasing; an apparatus which can control injection of the reducing agent according to a first amount that is smaller than a saturated amount corresponding to the temperature of the catalyst if it is determined that the temperature does not decrease continuously for a time; and a second apparatus which can control the injection of the reducing agent according to a second amount that is larger than the first amount and smaller than the saturated amount if it is determined that the temperature of the reduction catalyst continuously decreases for a time.

4 Claims, 6 Drawing Sheets

CONTROL DEVICE AND CONTROL METHOD FOR EXHAUST GAS PURIFICATION APPARATUS, AND INTERNAL COMBUSTION ENGINE EXHAUST GAS PURIFICATION APPARATUS

TECHNICAL FIELD

The present invention relates to a control device and a control method for an exhaust gas purification apparatus, as well as an internal combustion engine exhaust gas purification apparatus. More particularly, the invention relates to a control device and a control method for an exhaust gas purification apparatus provided with a reduction catalyst that selectively reduces $NO_X$ in exhaust gas using a reducing agent, and an internal combustion engine exhaust gas purification apparatus provided with such a control device.

BACKGROUND ART

Conventionally, the exhaust gas from internal combustion engines, such as diesel engines, contains nitrogen oxides (hereinafter referred to as "$NO_X$"), which can cause environmental pollutions. An SCR (Selective Catalytic Reduction) system using a urea solution as the reducing agent is known as an exhaust gas purification apparatus for reducing the $NO_X$ (NO and $NO_2$) to purify the exhaust gas.

This SCR system is as follows. The urea solution as the reducing agent is supplied into an exhaust gas passage at an upstream side of the reduction catalyst. The ammonia produced by hydrolysis of the urea solution is adsorbed by a reduction catalyst. $NO_x$ that flows into the reduction catalyst is caused to react with the ammonia, so that the $NO_x$ is decomposed into nitrogen, water, carbon dioxide, and the like and then emitted.

A known method for supplying the reducing agent in such an SCR system is as follows. For example, a urea solution stored in a storage tank is pumped by a reducing agent supply pump, and the urea solution is supplied into an exhaust gas passage by a reducing agent injection valve disposed so that an injection hole thereof faces the exhaust gas passage.

In the case where a urea solution is used as the reducing agent, when the amount of the reducing agent injected is too small relative to the amount of $NO_x$ contained in the exhaust gas, the $NO_x$ reduction efficiency becomes poor. As a consequence, there is a risk that the $NO_x$ that is not reduced may be emitted. On the other hand, when the amount of the reducing agent injected is too large, the ammonia produced by hydrolysis of the urea solution may slip to a $NO_x$ downstream side. Ammonia shows relatively high toxicity. For this reason, the ammonia is oxidized and reduced to $NO_x$ that has relatively low toxicity by placing an oxidation catalyst in the downstream side of the reduction catalyst, or an ammonia decomposing catalyst is provided to decompose the ammonia into nitrogen and water, so that emission of the slipped ammonia into atmosphere can be prevented. In other words, when the amount of reducing agent injected is too large, there is a risk that $NO_x$ may be emitted in a similar way to the case where the injection amount is too small. Moreover, the consumption efficiency of the reducing agent reduces.

In view of this, a control method for an exhaust gas purification apparatus that optimizes the supply amount of reducing agent has been disclosed. More specifically, the method disclosed is a control method for an exhaust gas purification apparatus that reduces and purifies $NO_x$ in the exhaust gas by adding a reducing agent to the upstream side of a $NO_x$ reduction catalyst incorporated in an engine exhaust gas passage.

The method is characterized as follows. A target adsorption amount curve in which a saturated adsorption amount curve representing the relationship between the catalyst temperature and the saturated adsorption amount of the reducing agent to the $NO_x$ reduction catalyst is shifted to a low temperature side is set. The target adsorption amount of the reducing agent corresponding to the catalyst temperature is calculated, and the actual adsorption amount of the reducing agent to the $NO_x$ reduction catalyst is obtained. The addition amount of the reducing agent to the upstream side of the $NO_x$ reduction catalyst is reduced when the actual adsorption amount reaches the target adsorption amount, while the addition amount of the reducing agent is increased when the actual adsorption amount becomes lower than the target adsorption amount. In addition, a control method in which a predicted temperature of the catalyst after a predetermined time is obtained and the amount of the shift of the target adsorption amount curve is corrected according to the predicted temperature of the catalyst has been disclosed as one embodiment of the control method. (See Patent Document 1.)

Patent Document 1: JP-A-2006-22729 (the entire text, all the drawings)

DISCLOSURE OF THE INVENTION

Problems that the Invention is to Solve

As shown in the solid line A of FIG. 2, the ammonia saturated adsorption amount of the reduction catalyst increases as the catalyst temperature lowers. For this reason, when the temperature of the reduction catalyst is in the low temperature side, it is necessary to cause the reduction catalyst to adsorb a greater amount of ammonia in order to increase the reduction efficiency of $NO_x$. However, there is a problem that the amount of ammonia that is actually adsorbed by the reduction catalyst (hereinafter referred to as "actual adsorption amount") becomes less when the temperature of the reduction catalyst is lower because the lower the temperature of the reduction catalyst, the less easily the hydrolysis of the reducing agent occurs and the less easily ammonia is produced. The foregoing Patent Document 1 does not take such a problem into consideration.

Moreover, the exhaust gas purification apparatus control method described in Patent Document 1 is such that the reducing agent is injected according to the highest temperature among the predicted reduction catalyst temperatures obtained. Therefore, there is a risk that the actual ammonia adsorption amount of the reduction catalyst may decrease greatly when the temperature of the reduction catalyst continues to decrease, such as when the internal combustion engine shifts to an idle operation, when the internal combustion engine is decelerating, and when the internal combustion engine is stopped. As a consequence, there is a risk that the reduction efficiency of $NO_x$ decreases until the time when the catalyst temperature increases next.

In view of this, the inventors of this invention have made assiduous effort and found that such problems can be resolved by performing reducing agent injection control such that the value of the target adsorption amount is set large when it is predicted that the temperature of the reduction catalyst continues to shift to a low temperature side for a predetermined time or longer. Thus, the inventors have accomplished the invention. Accordingly, it is an object of the invention is to provide a control device and a control method for an exhaust gas purification apparatus that can prevent the actual adsorption amount of ammonia from becoming excessively lower than the saturated adsorption amount and can prevent the reduction efficiency of the reduction catalyst from degrading even when the temperature of the reduction catalyst continues to shift to a low temperature side for a predetermined time or longer, as well as to provide an internal combustion engine exhaust gas purification apparatus provided with such a control device.

Means for Solving the Problems

The invention provides a control device for an exhaust gas purification apparatus for injecting a reducing agent into an exhaust gas passage of an internal combustion engine, at an upstream side of a reduction catalyst, disposed in the exhaust gas passage, for selectively reducing $NO_x$ in an exhaust gas emitted from the internal combustion engine, the control device including: a temperature transition determining means for predicting a transition of the temperature of the reduction catalyst and determining whether or not the temperature of the reduction catalyst continues to decrease for a predetermined time or longer; a first injection controlling means for injecting the reducing agent according to a first target adsorption amount that is a smaller value than a saturated adsorption amount of the reducing agent corresponding to the temperature of the reduction catalyst if it is determined that the temperature of the reduction catalyst does not decrease continuously for a predetermined time or longer; and a second injection controlling means for injecting the reducing agent according to a second target adsorption amount that is a value larger than the first target adsorption amount and smaller than the saturated adsorption amount if it is determined that the temperature of the reduction catalyst continuously decrease for a predetermined time or longer. Thus, the invention can resolve the foregoing problems.

When configuring the control device for an exhaust gas purification apparatus according to the invention, it is preferable that the control device have an injection stopping means for stopping injection of the reducing agent when the temperature of the reduction catalyst is equal to or lower than a reference temperature.

When configuring the control device for an exhaust gas purification apparatus according to the invention, it is preferable that the temperature transition determining means determine whether or not the temperature of the reduction catalyst becomes equal to or lower than a reference temperature by determining whether or not the temperature of the reduction catalyst continues to decrease for a predetermined time or longer.

Another embodiment of the invention is a control method for an internal combustion engine exhaust gas purification apparatus for injecting a reducing agent into an exhaust gas passage of an internal combustion engine at an upstream side of a reduction catalyst, disposed in the exhaust gas passage, for selectively reducing $NO_x$ in an exhaust gas emitted from the internal combustion engine, the control method including: predicting a transition of the temperature of the reduction catalyst and determining whether or not the temperature of the reduction catalyst continues to decrease for a predetermined time or longer; injecting the reducing agent according to a first target adsorption amount that is a smaller value than a saturated adsorption amount of the reducing agent corresponding to the temperature of the reduction catalyst if it is determined that the temperature of the reduction catalyst does not continue to decrease for a predetermined time or longer; and injecting the reducing agent according to a second target adsorption amount that is a value larger than the first target adsorption amount and smaller than the saturated adsorption amount if it is determined that the temperature of the reduction catalyst continues to decrease for a predetermined time or longer.

When implementing the control method for an exhaust gas purification apparatus according to the invention, it is preferable to determine that the temperature of the reduction catalyst continues to decrease for a predetermined time or longer when the internal combustion engine shifts to an idle operation, when the internal combustion engine is decelerating, or when the internal combustion engine stops.

Yet another embodiment of the invention is an internal combustion engine exhaust gas purification apparatus provided with a reduction catalyst, disposed in an exhaust gas passage of an internal combustion engine, for selectively reducing $NO_x$ in an exhaust gas emitted from the internal combustion engine, and a reducing agent supply device for injecting a reducing agent into the exhaust gas passage at an upstream side of the reduction catalyst, the exhaust gas purification apparatus provided with a control device including: a temperature transition determining means for predicting a transition of the temperature of the reduction catalyst and determining whether or not the temperature of the reduction catalyst continues to decrease for a predetermined time or longer; a first injection controlling means for injecting the reducing agent according to a first target adsorption amount that is a smaller value than a saturated adsorption amount of the reducing agent corresponding to the temperature of the reduction catalyst if it is determined that the temperature of the reduction catalyst does not continue to decrease for a predetermined time or longer; and a second injection controlling means for injecting the reducing agent according to a second target adsorption amount that is a value larger than the first target adsorption amount and smaller than the saturated adsorption amount if it is determined that the temperature of the reduction catalyst continues to decrease for a predetermined time or longer.

Advantageous Effects of the Invention

The control device for an exhaust gas purification apparatus according to the invention can predict a transition of the temperature of the reduction catalyst and can inject the reducing agent in an amount greater than a reducing agent injection amount in a normal mode if the temperature of the reduction catalyst continues to decrease for a predetermined time or longer. Therefore, a relatively large amount of ammonia is allowed to be kept adsorbed on the catalyst in advance even in the case where the temperature continuously decreases so that ammonia is not produced easily and the actual adsorption amount decreases. As a result, the reduction efficiency of $NO_x$ can be prevented from degrading considerably.

Moreover, the reducing agent injection amount is increased in the condition in which the catalyst temperature continuously decrease, which is the condition in which the saturated adsorption amount increases. Therefore, there is no risk that ammonia slip occurs, so the reduction efficiency of $NO_x$ can be improved, and the consumption efficiency of the reducing agent can be prevented from degrading.

Furthermore, the control device for an exhaust gas purification apparatus according to the invention may be provided with an injection stopping means for stopping injection of the reducing agent when the temperature of the catalyst is equal to or lower than a reference temperature. Therefore, the reducing agent can be supplied under the condition in which the reducing agent does not undergo hydrolysis and ammonia is not produced, so the reduction catalyst is prevented from adhesion of the reducing agent.

In addition, the control device for an exhaust gas purification apparatus of the invention enables the catalyst to adsorb ammonia in at least an amount equal to or greater than the target adsorption amount at the time of stopping the injection by increasing the reducing agent injection amount when it is predicted that the catalyst temperature becomes equal to or lower than a reference temperature at which the injection of the reducing agent is stopped. Therefore, the reduction efficiency of $NO_x$ can be improved until the time when the subsequent injection of the reducing agent is started. Moreover, the adsorption amount of ammonia becomes larger at the time point at which the subsequent injection of the reducing agent is started. The reduction efficiency of $NO_x$ thereafter is also improved.

According to the control method for an exhaust gas purification apparatus of the invention, the reducing agent injection amount is controlled so as to be greater than that in the normal mode in the case where it is predicted that the temperature of the reduction catalyst continues to decrease for a predetermined time or longer. Therefore, a relatively large amount of ammonia is allowed to be kept adsorbed on the catalyst in advance even in the case where the temperature continuously decrease so that ammonia is not produced easily and the actual adsorption amount decreases. As a result, the reduction efficiency of $NO_x$ can be prevented from degrading. In addition, this control is performed under the condition in which the saturated adsorption amount of ammonia is increasing. Therefore, the risk of ammonia slip is lowered, and the consumption efficiency of the reducing agent can be prevented from degrading.

Moreover, the control method for an exhaust gas purification apparatus of the invention can keep a relatively large actual adsorption amount of ammonia even in the cases where the temperature of the reduction catalyst decreases and the supply of the reducing agent is stopped at the time of shifting to an idle operation, decelerating, or internal combustion engine stopping. Therefore, the reduction efficiency of $NO_x$ can be prevented from degrading considerably.

According to the internal combustion engine exhaust gas purification apparatus of the invention, the reducing agent is injected in a larger amount than the reducing agent injection amount in the normal mode in the case where the temperature of the reduction catalyst continues to decrease for a predetermined time or longer, so a relatively large amount of ammonia can be kept adsorbed on the catalyst. Therefore, it becomes possible to provide an exhaust gas purification apparatus that does not cause a considerable decrease in the reduction efficiency of $NO_x$ even in the case where the temperature continuously decreases so that ammonia is not produced easily and the actual adsorption amount decreases.

Moreover, the reducing agent injection amount is increased in the condition in which the saturated adsorption amount increases, in other words, in the condition in which the catalyst temperature continuously decreases. Therefore, there is little risk that ammonia slip occurs, so the reduction efficiency of $NO_x$ can be improved, and the consumption efficiency of the reducing agent can be prevented from degrading.

BEST MODE FOR CARRYING OUT THE INVENTION

Figure 1:
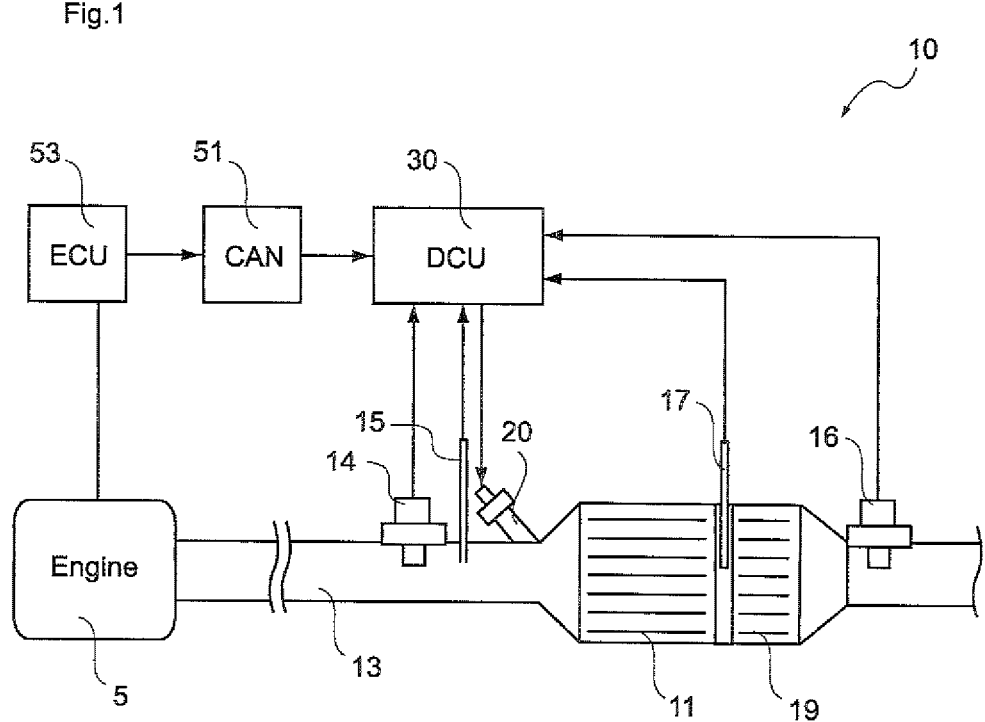
FIG. 1 is a view for illustrating an example of the configuration of an internal combustion engine exhaust gas purification apparatus according to an embodiment.

Hereinbelow, embodiments of a control device and a control method for an exhaust gas purification apparatus as well as an internal combustion engine exhaust gas purification apparatus according to the invention will be described in detail with reference to the drawings. It should be noted, however, that such embodiments are merely illustrative and not limiting of the invention, and various modifications may be made within the scope of the invention.

It should be noted that in the drawings, same members are denoted by same reference numerals, and the description thereof may be omitted as appropriate.

1. Internal Combustion Engine Exhaust Gas Purification Apparatus (SCR System)

First, an example of the configuration of an internal combustion engine exhaust gas purification apparatus that is furnished with a control device for an exhaust gas purification apparatus (hereinafter also referred to as "reducing agent injection control device") according to the present embodiment is described with reference to FIG. 1.

An exhaust gas purification apparatus 10 shown in FIG. 1 uses a urea aqueous solution as a reducing agent. The exhaust gas purification apparatus 10 selectively reduces $NO_x$ by a reduction catalyst 11. This exhaust gas purification apparatus 10 is disposed in a mid portion of an exhaust gas passage 13 connected to an internal combustion engine 5. The exhaust gas purification apparatus 10 has a reduction catalyst 11 for selectively reducing the $NO_x$ contained in the exhaust gas and a reducing agent supply device 20 for injecting the reducing agent into the exhaust gas passage 13 in the upstream side of the reduction catalyst 11. An upstream-side NOx sensor 14 and an upstream-side temperature sensor 15 are disposed in the upstream side of the reduction catalyst 11, and a downstream-side $NO_x$ sensor 16 and a downstream-side temperature sensor 17 are disposed in the downstream side of the reduction catalyst 11. In addition, an oxidation catalyst 19 is disposed in the downstream side of the reduction catalyst 11.

The exhaust gas purification apparatus 10 also has a control device 30 (hereinafter also referred to as "DCU: Dosing Control Unit") for controlling the injection amount of the reducing agent from the reducing agent supply device 20.

This DCU 30 is connected to a CAN 51 (Controller Area Network) so that it can retrieve the information existing on the CAN 51. A control unit 53 (hereinafter also referred to as "ECU: Engine Control Unit") for controlling the operating state of the internal combustion engine is connected to the CAN 51 so that not only the information related to the operating state of the internal combustion engine, such as the fuel injection amount, the injection timing, the rotational frequency, and the like is input thereto but also the information of all the sensors and the like equipped for the exhaust gas purification apparatus 10 is input thereto. As will be described later, the DCU 30 is configured to perform drive control of the reducing agent supply device 20 based on a signal output from the CAN 51.

It should be noted that although the ECU 53 and the DCU 30 are configured to be separate control units and to exchange information via the CAN 51 in the present embodiment, it is possible to construct the ECU 53 and the DCU 30 as a single control unit. It is also possible to employ a configuration in which all the signals are input to the DCU 30 directly without passing through the CAN 51.

The internal combustion engine 5 that emits exhaust gas is typically a diesel engine or a gasoline engine. However, it is appropriate that the exhaust gas purification apparatus is targeted at a diesel engine, in which purification of $NO_x$ is problematic currently. In addition, the internal combustion engine 5 has an internal combustion engine operating-state detecting means (not shown) for detecting rotational frequency, fuel injection amount, fuel injection timing, and the like. The signals of the results of the detection are output to the ECU 53.

The reduction catalyst 11 used for the exhaust gas purification apparatus 10 of the invention is a catalyst that has the function to adsorb the ammonia produced from the reducing agent supplied by the reducing agent supply device 20 and to selectively reduce the $NO_x$ contained in the exhaust gas flowing into the catalyst. The reduction catalyst that can be used is not particularly limited as long as it has the function to adsorb ammonia. For example, it is possible to use a catalyst made of a zeolite-based material.

Figure 2:
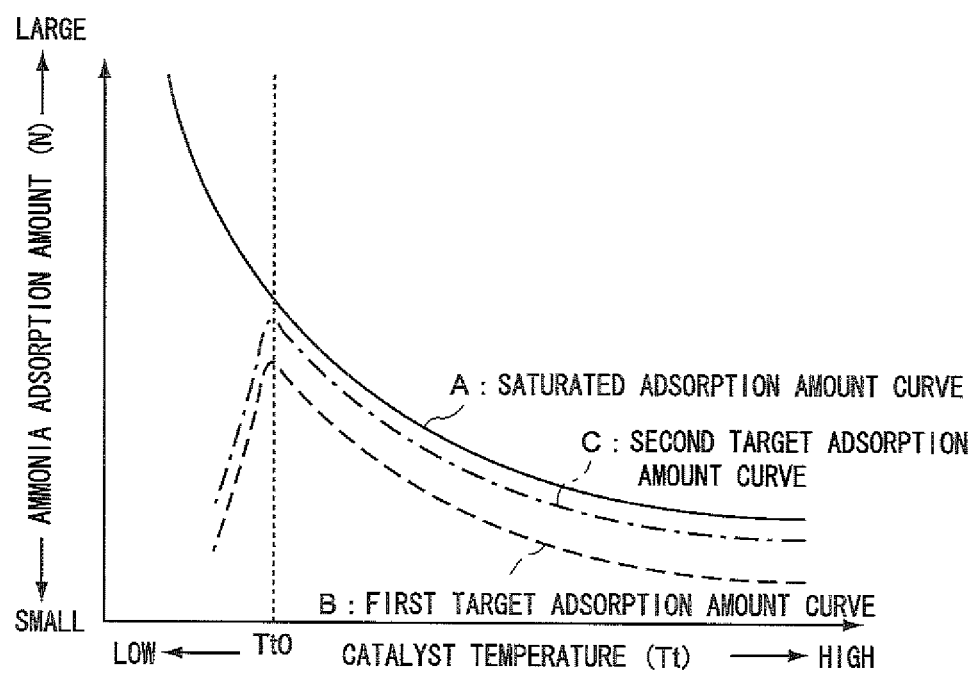
FIG. 2 is a graph illustrating a saturated adsorption amount curve, a first target adsorption amount curve, and a second target adsorption amount curve of a reduction catalyst.

FIG. 2 shows a saturated adsorption amount curve showing the relationship between the catalyst temperature of a reduction catalyst having such an ammonia adsorbing function and the saturated adsorption amount of ammonia thereof. The solid line A in FIG. 2 shows the saturated adsorption amount curve. It is understood that the temperature of the reduction catalyst and the saturated adsorption amount are in an inverse proportional relationship, so the saturated adsorption amount decreases as the temperature rises.

Figure 3:
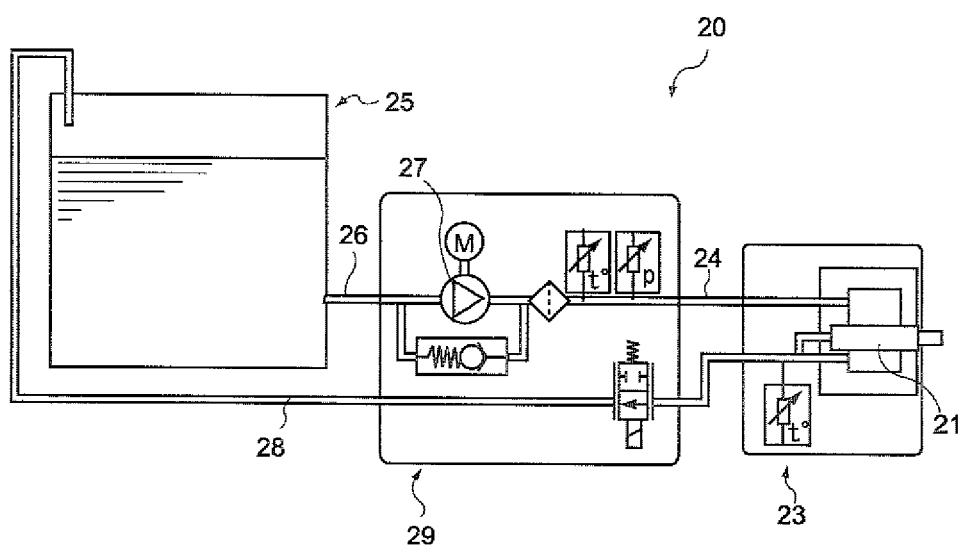
FIG. 3 is a view for illustrating an example of the configuration of a reducing agent supply device.

As shown in FIG. 1, the reducing agent supply device 20 is a device for injecting a reducing agent for reducing the $NO_x$ contained in the exhaust gas in the reduction catalyst 11 into the exhaust gas passage 13 at the upstream side of the reduction catalyst 11. As shown in FIG. 3, the reducing agent supply device 20 used in this embodiment has an injection module 23 containing a reducing agent injection valve 21, a storage tank 25 in which a liquid reducing agent is stored, and a pump module 29 containing a pump 27 for pumping the reducing agent in the storage tank 25 to the reducing agent injection valve 21. The pump module 29 and the injection module 23 are connected by a first supply passage 24. The storage tank 25 and the pump module 29 are connected by a second supply passage 26. The injection module 23 and the storage tank 25 are connected by a circulation passage 28.

The reducing agent supply device 20 provided for the exhaust gas purification apparatus of this embodiment is one that atomizes a liquid reducing agent while injecting it by the reducing agent injection valve 21. However, the configuration of the reducing agent supply device 20 in the invention is not particularly limited. For example, it is possible to use an air-assist type reducing agent supply device that makes a liquid reducing agent into an atomized state using high-pressure air and supplies the reducing agent into the exhaust gas passage.

A reducing agent such that ammonia is produced until it reaches reduction catalyst can be suitably used as the reducing agent. Typical examples include a urea aqueous solution and an ammonia aqueous solution.

When a urea aqueous solution is used, for example, the urea injected into exhaust gas passage is thermally decomposed by the heat in the exhaust gas and thereafter ammonia ($NH_3$) is produced by hydrolysis, so that the ammonia is adsorbed by the reduction catalyst. This $NH_3$ reacts with the $NO_x$ in the exhaust gas flowing into the reduction catalyst, whereby the $NO_x$ is decomposed into nitrogen ($N_2$) and water ($H_2O$), which are emitted.

The oxidation catalyst 19 disposed in the downstream side of the reduction catalyst 11 is one used mainly for oxidizing ammonia into $NO_x$ that has relatively low toxicity before emission when ammonia is not adsorbed by the reduction catalyst, and slips and flows out to the downstream side. Usable oxidation catalysts are not particularly limited. It is possible to use a known catalyst, for example, one in which a predetermined amount of a rare-earth element such as cerium is added to platinum that is carried on alumina.

It is also possible to use an ammonia decomposing catalyst that decomposes ammonia into nitrogen ($N_2$) and water ($H_2O$), in place of the oxidation catalyst.

The upstream-side temperature sensor 15 and the downstream-side temperature sensor 17 are used for measuring the temperatures of the exhaust gas at respective locations. The DCU 30 is configured to estimate the temperature of the reduction catalyst 11 making use of the temperature signals that are output from these temperature sensors. Publicly known sensors may be used for these temperature sensors.

It should be noted that these temperature sensors may be omitted when the temperatures of the reduction catalyst 11 at the upstream side and the downstream side are estimated by computation.

The upstream-side $NO_x$ sensor 14 and the downstream-side $NO_x$ sensor 16 are used for measuring the $NO_x$ concentrations in the exhaust gas at respective locations. Since the amount of $NO_x$ emitted from the internal combustion engine is obtained according to the detected value of the upstream-side $NO_x$ sensor 14, the DCU 30 is configured to compute the reducing agent injection amount according to the exhaust $NO_x$ amount. It is possible to employ a configuration in which the upstream-side $NO_x$ sensor 14 is omitted and the exhaust $NO_x$ amount is estimated from the operating state of the internal combustion engine 5.

Since the amount of $NO_x$ emitted to the atmosphere is obtained from the detected value of the downstream-side $NO_x$ sensor 16, the DCU 30 is configured to compute the reducing agent injection amount so that this $NO_x$ amount becomes small.

It should be noted that these $NO_x$ sensors may be omitted when the $NO_x$ concentrations in the upstream side and the downstream side of the reduction catalyst are estimated by computation.

2. Control Device for Exhaust Gas Purification Apparatus (DCU)

Figure 4:
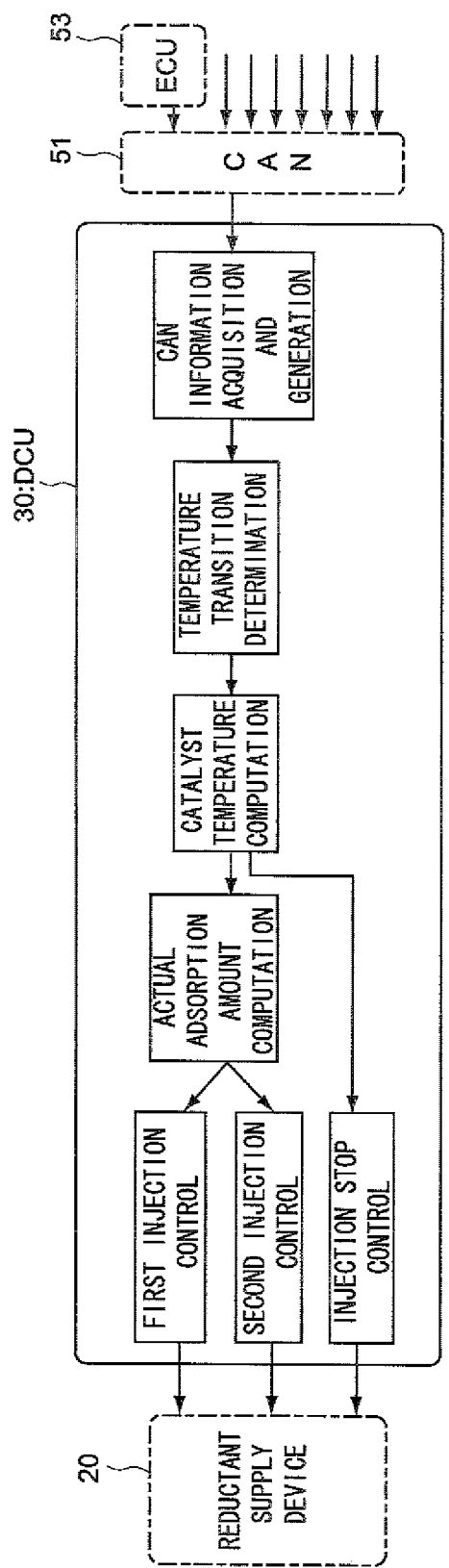
FIG. 4 is a view for illustrating an example of the configuration of an exhaust gas purification apparatus control device (DCU) according to an embodiment.

The DCU 30 provided for the exhaust gas purification apparatus of the present embodiment is mainly composed of a microcomputer with a publicly known configuration. FIG. 4 shows an example of the configuration of the portions of the DCU 30 that are related to injection control for the reducing agent supply device 20, shown as functional blocks.

Specifically, the DCU 30 in this embodiment includes, as its primary component parts: a CAN information acquiring and generating unit (denoted as "CAN information acquisition and generation" in FIG. 4); a catalyst temperature computing unit (denoted as "catalyst temperature computation" in FIG. 4) for computing the temperature of the reduction catalyst; a temperature transition determining unit (denoted as "temperature transition determination" in FIG. 4) for predicting a transition of the temperature of the reduction catalyst and determining whether or not the temperature of the reduction catalyst continuously decreases; an actual adsorption amount computing unit (denoted as "actual adsorption amount computation" in FIG. 4) for computing the actual adsorption amount of ammonia in the reduction catalyst; a first injection control unit (denoted as "first injection control" in FIG. 4) for controlling the reducing agent injection amount according to the first target adsorption amount; a second injection control unit (denoted as "second injection control" in FIG. 4) for controlling the reducing agent injection amount according to a second target adsorption amount; and an injection stop control unit (denoted as "injection stop control" in FIG. 4) for stopping injection when the temperature of the reduction catalyst is equal to or lower than a reference temperature. Specifically, these units are realized by execution of programs by a microcomputer (not shown). The DCU 30 also has a RAM (Random Access Memory) for storing the temperature information of the reduction catalyst, the reducing agent injection instruction value, and the like.

Among these, the CAN information acquiring and generating unit is configured to retrieve signals related to the operating state of the internal combustion engine that exist on the CAN 51 to which the DCC 30 is connected and detected signals from various sensors, and to output the signals to other units.

The catalyst temperature computing unit is configured to compute the temperature of the reduction catalyst based on the temperature signals detected by the upstream-side temperature sensor and the downstream-side temperature sensor that are output from the CAN information acquiring and generating unit.

The temperature transition determining unit in the DCU 30 of this embodiment is configured to predict a transition of the temperature of the reduction catalyst based on the rotational frequency signal and the torque signal of the internal combustion engine that are output from the CAN information acquiring and generating unit and to determine whether or not the catalyst temperature is in such a condition as to decrease continuously for a predetermined time or longer. The predetermined time at this time may be set as appropriate. For example, it may be set at a time such that it can be determined whether or not the temperature of the reduction catalyst drops to reference temperature at which ammonia is not easily produced.

The temperature transition determining unit predicts that the temperature of the reduction catalyst continuously decreases, for example, in the case where the rotational frequency of the internal combustion engine is lower than a predetermined threshold value or the torque becomes minus. Other than this, it is possible to read the exhaust gas temperature signal detected by the upstream-side temperature sensor and the temperature of the reduction catalyst calculated by the catalyst temperature computing unit continuously and to predict and determine a temperature transition from the results.

The injection stop control unit is configured to send an injection stop control signal to the reducing agent supply device when the temperature of the reduction catalyst calculated by the catalyst temperature computing unit is equal to or lower than a predetermined reference temperature. This reference temperature is set in such a manner that the temperature of the reduction catalyst becomes a temperature condition in which ammonia production by hydrolysis of the supplied reducing agent does not easily occur. An example is a value within the range of from 150° C. to 200° C. Accordingly, when the temperature of the reduction catalyst is equal to or lower than the reference temperature, the reducing agent is not supplied and the actual adsorption amount of ammonia in the reduction catalyst continuously decreases.

The actual adsorption amount computing unit is configured to compute the actual adsorption amount of ammonia in the reduction catalyst, for example, by adding the amount of ammonia that is already adsorbed on the reduction catalyst to the value obtained by accumulating the values obtained by subtracting the amounts of ammonia used for reducing the $NO_x$ contained in the exhaust gas from the amounts of ammonia corresponding to the actually injected reducing agent amounts.

The first injection control unit is configured to decide the reducing agent injection amount according to the first target adsorption amount that is smaller than the saturated adsorption amount of the reduction catalyst and to send a control signal to a manipulation device for the reducing agent supply device if the temperature transition determining unit determines that the temperature of the reduction catalyst does not decrease continuously for a predetermined time or longer. That is, the injection control in the normal mode is performed by the first injection control unit in the case where the temperature of the reduction catalyst continues to increase or the case where the increase and decrease are repeated frequently.

The first injection control unit in the DCU 30 of this embodiment firstly reads the first target adsorption amount corresponding to the catalyst temperature at the time of the temperature transition determination based on the first target adsorption amount curve indicating the relationship between the catalyst temperature and the first target adsorption amount. The first injection control unit is configured to compute the reducing agent injection amount thereafter so that ammonia flows into the reduction catalyst in an amount equal to the difference value between the actual adsorption amount of ammonia that is calculated by the actual adsorption amount computing unit and the first target adsorption amount that is read by the first injection control unit.

This first target adsorption amount curve may be set so that the first target adsorption amount is about 70% to 90% of the saturated adsorption amount, as shown by the dashed line B in FIG. 2. By making the first target adsorption amount smaller than the saturated adsorption amount, it is possible to prevent the ammonia slip to the reduction catalyst downstream side resulting from the supply of ammonia in an amount that exceeds the saturated adsorption amount of ammonia. Moreover, even when a sudden temperature increase of the reduction catalyst occurs, it is possible to prevent the ammonia slip to the reduction catalyst downstream side resulting from the supply of ammonia in an amount that exceeds the saturated adsorption amount of ammonia. Furthermore, when first target adsorption amount is set at such a proportion, the reduction efficiency of $NO_x$ does not degrade considerably.

The second injection control unit is configured to decide the reducing agent injection amount according to the second target adsorption amount that is larger than the first target adsorption amount and smaller than the saturated adsorption amount of the reduction catalyst and to send a control signal to the manipulation device for the reducing agent supply device if the temperature transition determining unit determines that the temperature of the reduction catalyst continues to decrease for a predetermined time or longer. That is, the injection control in an increment mode is performed by the second injection control unit when the temperature of the reduction catalyst continuously decrease, such as when the internal combustion engine shifts to an idle state, when the internal combustion engine is decelerating, or when the internal combustion engine stops.

The second injection control unit in the DCU 30 of this embodiment firstly reads the second target adsorption amount corresponding to the catalyst temperature at the time of the temperature transition determination based on the second target adsorption amount curve indicating the relationship between the catalyst temperature and the second target adsorption amount. The second injection control unit is configured to compute the reducing agent injection amount thereafter so that ammonia flows into the reduction catalyst in an amount equal to the difference value between the actual adsorption amount of ammonia that is calculated by the actual adsorption amount computing unit and the second target adsorption amount that is read by the second injection control unit.

This second target adsorption amount curve may be set so that the second target adsorption amount is about 85% to 95% of the saturated adsorption amount, as shown by the dash-dotted line C in FIG. 2. By setting the second target adsorption amount to be larger than the first target adsorption amount, a relatively large amount of ammonia can be kept adsorbed at all times even in a condition in which the saturated adsorption amount continuously increases while ammonia is not easily produced. Moreover, when the saturated adsorption amount is in a condition such as to increase continuously, the risk of supplying ammonia in an amount that exceeds the saturated adsorption amount of the reduction catalyst and flowing out to the downstream side of the reduction catalyst is lessened, even in the case where the reducing agent injection amount is increased.

In particular, in the case where the reducing agent injection is configured to be stopped when the temperature of the reduction catalyst is equal to or lower than the reference temperature as in this embodiment, the injection control can be performed in an increment mode when the catalyst temperature decreases to the reference temperature or lower so that a relatively large amount of ammonia can be kept adsorbed on the reduction catalyst until the reducing agent injection is stopped. As a result, the reduction efficiency of $NO_x$ can be prevented from degrading even in a temperature condition such that the temperature of the reduction catalyst is low and the reducing agent does not undergo hydrolysis. Furthermore, the reduction of $NO_x$ can be performed efficiently from the time when the internal combustion engine is started again after the internal combustion engine has stopped until the exhaust temperature increases.

3. Control Method for Exhaust Gas Purification Apparatus

Figure 5:
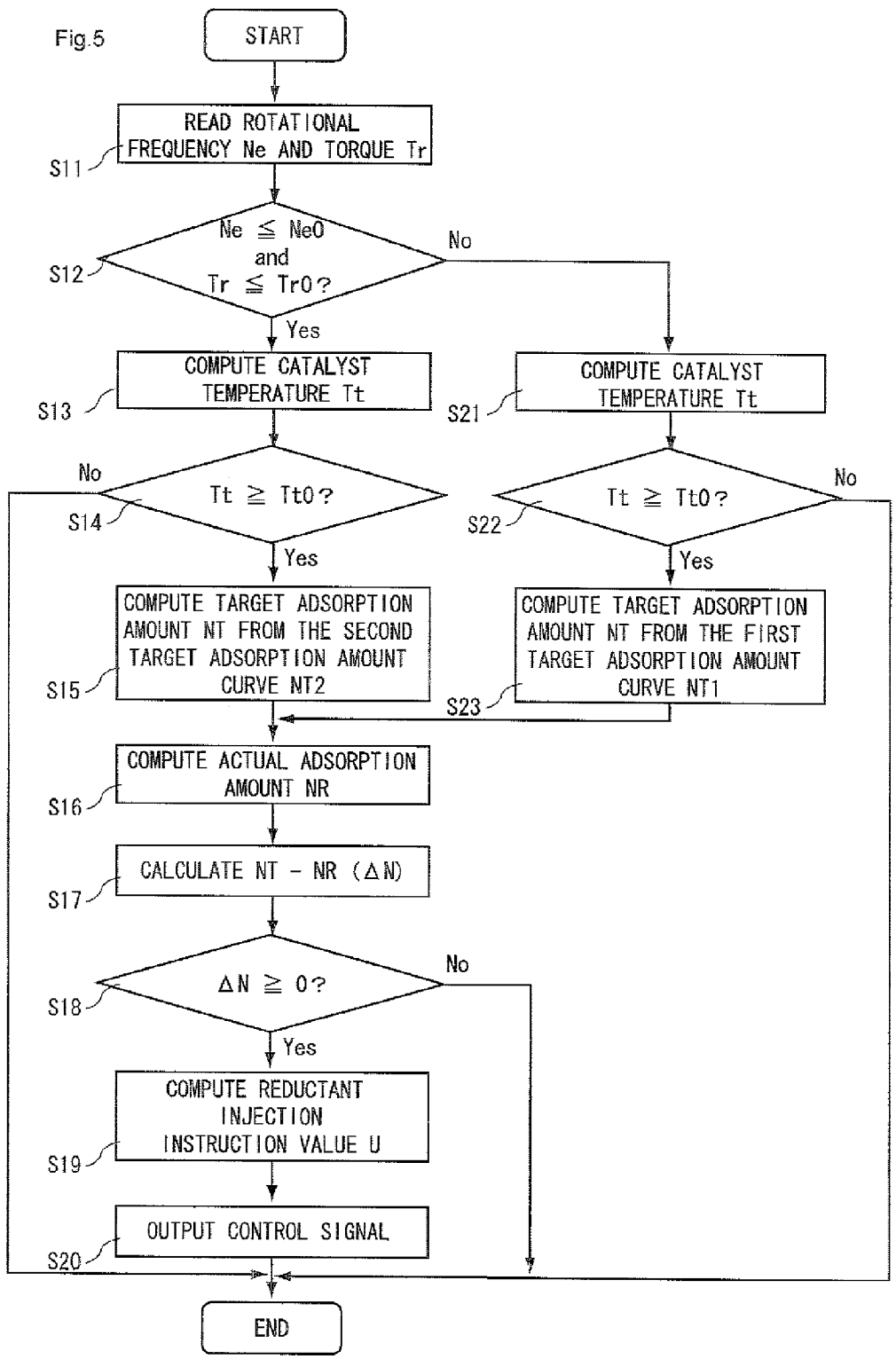
FIG. 5 is a flow chart for illustrating a control method for an exhaust gas purification apparatus according to an embodiment.

Next, an example of a routine of a control method for an exhaust gas purification apparatus that is performed using the control device for an exhaust gas purification apparatus shown in FIG. 4 will be described with reference to the flow chart of FIG. 5. It should be noted that this routine is executed at all times in the operating state of the internal combustion engine.

First, in step S11 after start, signals indicating the rotational frequency Ne and the torque Tr of the internal combustion engine are read. Next, in step S12, it is determined whether or not the rotational frequency Ne and the torque Tr of the internal combustion engine that have been read are equal to or lower than predetermined threshold values NeO and TrO. If the rotational frequency Ne and the torque Tr of the internal combustion engine exceed the predetermined threshold values NeO and TrO, it is determined as NOx in the determination at step S12, and the process proceeds to step S21.

After step S21, reducing agent injection control in the normal mode is performed.

First, in step S21, the catalyst temperature Tt is computed based on the temperature signals detected by the upstream-side temperature sensor and the downstream-side temperature sensor. Thereafter, in step S22, it is determined whether or not the catalyst temperature Tt is equal to or higher than a predetermined reference temperature TtO. This step S22 is for determining whether or not the temperature Tt of the reduction catalyst is equal to or higher than a temperature at which the reducing agent can undergo hydrolysis and ammonia can be produced. If the catalyst temperature Tt is lower than the predetermined reference temperature TtO, it is determined as NOx in the determination of step S22, and the process is finished without carrying out reducing agent injection. On the other hand, if the catalyst temperature Tt is equal to or higher than the predetermined reference temperature TtO, it is determined as YES in the determination of step S22, so in step S23, the target adsorption amount NT of ammonia corresponding to the catalyst temperature Tt is obtained from the first target adsorption amount curve NT1, and then the process proceeds to step S16.

On the other hand, in the above-mentioned step S12, if the rotational frequency Ne and the torque Tr of the internal combustion engine are equal to or lower than the predetermined threshold values Ne0 and Tr0, it is determined as YES and the process proceeds to step S13. In this case, there is a risk that the temperature Tt of the reduction catalyst continuously keeps decreasing and drops below the reference temperature Tt0 so reducing agent injection control in an increment mode is performed after step S13.

In the increment mode, first, the catalyst temperature Tt is computed based on the temperature signals detected by the upstream-side temperature sensor and the downstream-side temperature sensor in step S13. Thereafter, in step S14, it is determined whether or not the catalyst temperature Tt is equal to or higher than the predetermined reference temperature TtO. This step S14 is, like step S22, for determining whether or not the temperature Tt of the reduction catalyst is equal to or higher than a temperature at which the reducing agent can undergo hydrolysis and ammonia can be produced. If the catalyst temperature Tt is lower than the predetermined reference temperature Tt0, it is determined as NOx in the determination of step S14, and the process is finished without carrying out reducing agent injection. On the other hand, if the catalyst temperature Tt is equal to or higher than the predetermined reference temperature TtO, it is determined as YES in the determination of step S14, so in step S15, the target adsorption amount NT of ammonia corresponding to the catalyst temperature Tt is obtained from the second target adsorption amount curve Nt2, and then the process proceeds to step S16.

Next, in step S16, the actual adsorption amount NR of the ammonia that is currently adsorbed on the reduction catalyst is computed. For example, the actual adsorption amount NR of ammonia in the reduction catalyst is computed by adding the amount of ammonia that is already adsorbed on the reduction catalyst (the previous value) to the value obtained by accumulating the values obtained by subtracting the amounts of ammonia used for reducing the $NO_x$ contained in the exhaust gas from the amounts of ammonia corresponding to the reducing agent amounts that have been actually injected until this time point.

Next, in step S17, the current adsorption amount NR of ammonia obtained in step S16 is subtracted from the target adsorption amount NT of ammonia obtained in step S15 or step S22, to calculate a deficit $\Delta N$. Subsequently, in step S18, it is determined whether or not the value of the deficit $\Delta N$ of ammonia obtained in step S17 is equal to or greater than 0. If the result is less than 0, it is determined as NO and the process is finished because ammonia needs not be supplied additionally. On the other hand, if the value is equal to or greater than 0, it is determined as YES, so the process proceeds to step S19, and a reducing agent injection instruction value U, which is the amount of the reducing agent to be injected from the reducing agent supply device.

Figure 6:
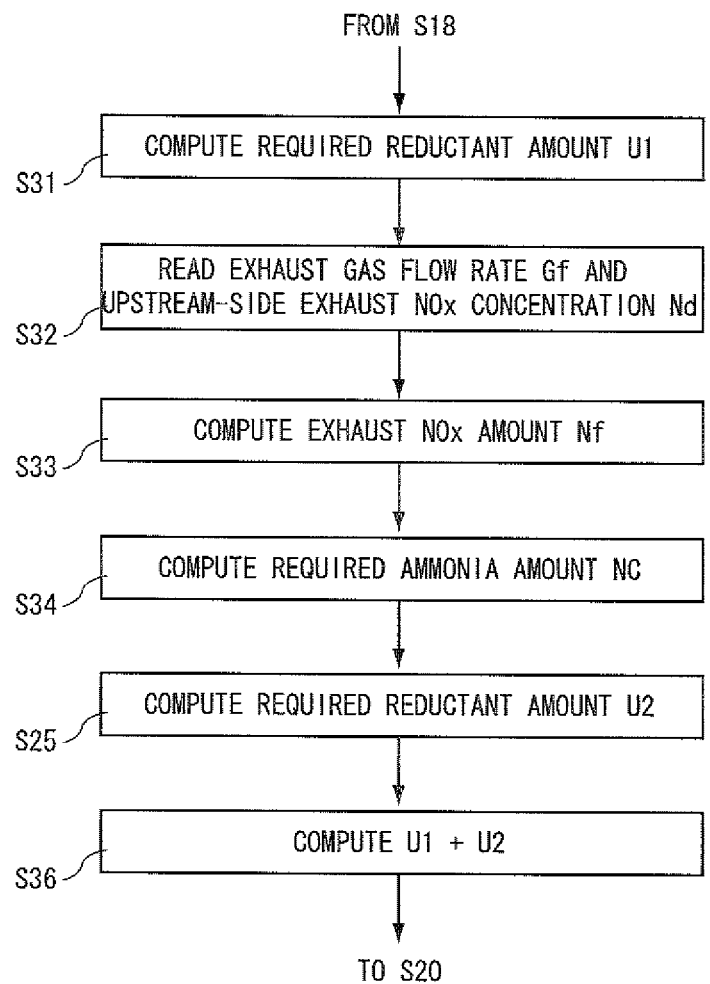
FIG. 6 is a flow chart for illustrating an example of a computation method for a reducing agent injection instruction value.

FIG. 6 shows an example of the computation flow for a reducing agent injection instruction value U that is performed in this step S19.

In this example, first, in step S31, a required reducing agent amount U1 at which ammonia can be produced in an amount of the deficit ΔN calculated in step S17 is computed.

Next, in step S32, signals indicating an exhaust gas flow rate Gf emitted from the internal combustion engine and an exhaust NOx concentration Nd detected by the upstream-side NOx sensor are read out. Thereafter, in step S33, the exhaust NOx amount Nf is computed from the exhaust gas flow rate Gf and the exhaust NOx concentration Nd. Then, in step S34, an ammonia amount NC required for reducing NOx in the exhaust NOx amount Nf is computed, and in step S25, a required reducing agent amount U2 at which ammonia in the ammonia amount NC can be produced is computed.

Next, in step S36, the required reducing agent amount U2 calculated in step S25 is added to the required reducing agent amount U1 calculated in step S31, to calculate a reducing agent injection instruction value U.

In the example of this FIG. 6, the exhaust NOx amount Nf that is currently flowing is obtained, and the ammonia amount NC corresponding to the exhaust NOx amount Nf is added to the reducing agent injection instruction value U1. However, steps S31 to S36 may be omitted, and the required reducing agent amount U1 calculated step S21 may be used as the injection instruction value U, taking only the target adsorption amount NT into consideration and without considering the amount Nf of exhaust NOx.

After calculating the reducing agent injection instruction value U in this way, a control signal corresponding to the reducing agent injection instruction value U is output to the reducing agent supply device 20 in step S20, and then the process is finished.

In this embodiment, a transition of the temperature of the reduction catalyst is predicted is predicted from the values of the rotational frequency Ne and the torque Tr of the internal combustion engine in step S11, but various types of methods may be employed for this prediction. For example, it may be predicted from a transition profile of the internal combustion engine rotational frequency or torque or from a transition profile of the exhaust gas temperature detected by the upstream-side temperature sensor. Furthermore, it may be predicted from a transition profile of the estimated temperature of the reduction catalyst that is computed by the upstream-side temperature sensor and the downstream-side temperature sensor.

The invention claimed is:

1. A control method for an internal combustion engine exhaust gas purification apparatus for injecting a reducing agent into an exhaust gas passage of an internal combustion engine at an upstream side of a reduction catalyst, disposed in the exhaust gas passage, for selectively reducing NOx in an exhaust gas emitted from the internal combustion engine, the control method comprising the steps of:
   predicting a transition of a temperature of the reduction catalyst and determining whether or not the temperature of the reduction catalyst continues to decrease for a predetermined time or longer;
   injecting the reducing agent according to a first target adsorption amount which is read based on a first target adsorption amount curve indicating a relationship between the temperature of the reduction catalyst and the first target adsorption amount that is a smaller value than a saturated adsorption amount of the reducing agent corresponding to the temperature of the reduction catalyst if it is determined that the temperature of the reduction catalyst does not continue to decrease for a predetermined time or longer; and
   injecting the reducing agent according to a second target adsorption amount which is read based on a second target adsorption amount curve indicating a relationship between the temperature of the reduction catalyst and the second target adsorption amount that is a value larger than the first target adsorption amount and smaller than a saturated adsorption amount if it is determined that the temperature of the reduction catalyst continues to decrease for a predetermined time or longer.

2. The control method for an exhaust gas purification apparatus according to claim 1, wherein it is determined that the temperature of the reduction catalyst continues to decrease for a predetermined time or longer when the internal combustion engine shifts to an idle operation, when the internal combustion engine is decelerating, or when the internal combustion engine stops.

3. The control method for an exhaust gas purification apparatus according to claim 1, further comprising the step of stopping the injection of the reducing agent when the temperature of the reduction catalyst is equal to or lower than a reference temperature.

4. The control method for an exhaust gas purification apparatus according to claim 1, further comprising the step of stopping the injection of the reducing agent when the temperature of the reduction catalyst is equal to or lower than a reference temperature and continues to decrease for a predetermined time or longer.

* * * * *